Oct. 13, 1970  K. T. L. ROSENGEN  3,533,118
LOADING BRIDGE
Filed June 20, 1967
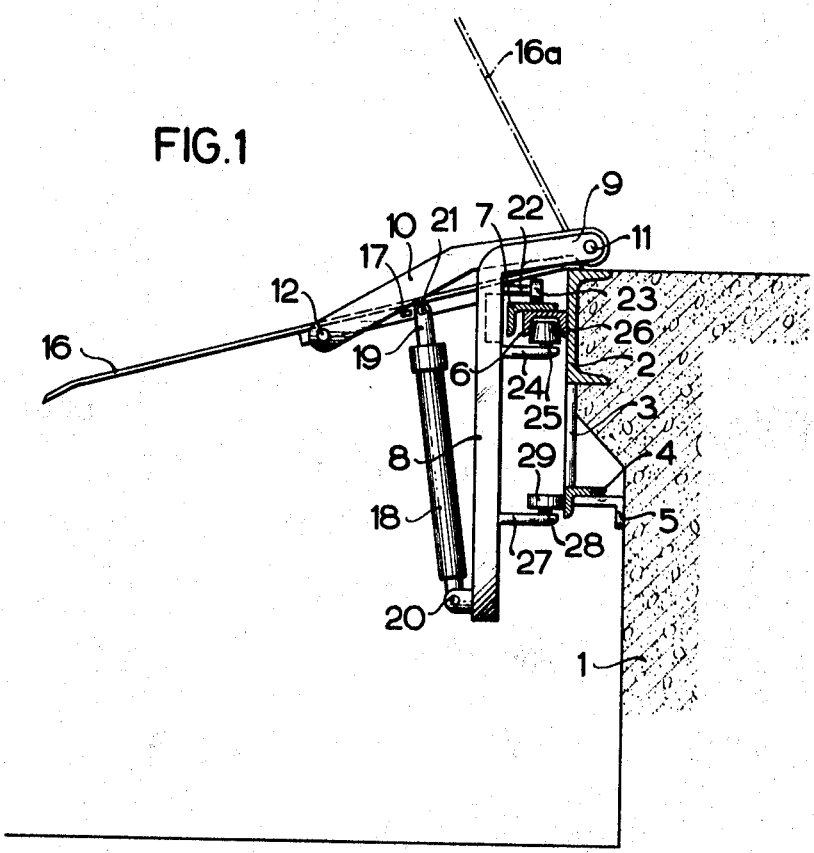
INVENTOR
KNUT TAGE LENNART ROSENGEN
By
W. A. DRUCKER
his ATTORNEY

United States Patent Office 3,533,118
Patented Oct. 13, 1970

3,533,118
LOADING BRIDGE
Knut Tage Lennart Rosengen, Eriksfaltsgatan 16B,
Malmo S, Sweden
Filed June 20, 1967, Ser. No. 651,346
Int. Cl. B65g 11/00
U.S. Cl. 14—71          4 Claims

ABSTRACT OF THE DISCLOSURE

Disclosed is an adjustable platform connecting a loading dock and a freight vehicle which is operated by a cylinder fixed to the underside of the dock platform and pivoted on movable arms so that the level of each end of the platform is adjustable with respect to the dock and the freight vehicle by movement of the piston means.

---

The present invention relates to a loading bridge for the transport of goods between a loading dock or a fixed loading platform and the load surface of a freight vehicle. The loading bridge is constructed as a vertically movable part arranged on a loading dock, which part by simple operation can easily be adjusted and adapted to the frequently varying height of the load surface above the ground. The bridge is intended to replace the loosely placed bridges used hitherto, which as a rule require complicated work so that they may be brought into the correct position in relation to the loading dock and to load surfaces of varying heights, so that loading personnel can safely walk on to these load surfaces in transferring the goods and the bridges cannot be unintentionally shifted out of their position during work.

The loading bridge according to the invention is characterised mainly in that, with its inner end edge overlapping the front side of the loading dock, the bridge is mounted for pivoting about a horizontal spindle parallel with the front of the loading dock. This spindle is arranged on arms protruding from the loading dock, which are mounted for pivoting on a horizontal spindle on a frame arranged on the loading dock. A further characteristic consists in that the loading bridge is adjustable by means of a hydraulic cylinder arranged on the frame.

Accordingly due to this arrangement the loading bridge can be let down until it rests on the load surface of the vehicle set beenath it, whereby all extra work with the careful and correct application of the bridge at the suitable angle of inclination between the loading dock and the load surface is avoided, so that the bridge can be walked on without risk and cannot be shifted during the loading or unloading work.

According to the invention the last-mentioned spindle can be arranged on a carriage movable along the loading dock. Due to the fact that the carriage is moved along the loading dock, the loading bridge consequently can be adjusted at any time into the most suitable position in relation to the unloading and loading openings of freight vehicles, for example the rear flap of a lorry or the door opening of a goods truck.

The shifting of the carriage carrying the loading bridge along the loading dock can take place in a number of different manners. In one suitable embodiment the carriage according to the invention is constructed as an angular chassis, the one approximately vertical part of which, placed before the loading dock, is provided with rollers by means of which the carriage is supported on the front of the loading dock, while in movement it rolls on guide rails, and there other part of which, extending above the edges of the loading dock, carries the pivoting spindle of the loading bridge.

The invention will be explained in greater detail hereinafter with reference to an example of a form of embodiment which is illustrated in the accompanying drawing, wherein:

FIG. 1 shows a vertical section through the loading dock and guide rails with a raisable and lowerable loading bridge arranged on the loading dock and movable along the latter, in the downwardly hinged position, FIG. 2 shows the loading bridge in the upwardly pivoted position in front elevation.

In the drawing, 1 designates the loading dock, into the upper, somewhat protruding region of which a channel girder 2 is cast with the flanges in horizontal position, the upper flange lying in one plane with the upper side of the loading dock. The web of the channel girder 2 is prolonged downwards by a plate 3, on the lower edge of which an angle iron 4 with unequal flanges is welded firmly, the horizontal flange of which is carried by brackets 5 on the dock 1. A U-rail 6 is welded with one of its downwardly directed flanges to the web of the girder 2, and on the upper side of the rail 6 there is welded a rail formed by an angle iron 7. The loading bridge 16 itself is mounted on a carriage which consists of a vertical frame 8, the side pieces of which are prolonged upwards into two arms 9 bent off at almost right-angles, which grip over the edge of the loading dock 1. The arms 9 are connected through pivot pins 11 with the inner ends of two joint arms 10, which are provided at their outer ends with inwardly directed pins 12, on which the loading bridge 16 rests.

The loading bridge 16 is further connected with the frame 8 through a piston rod 19 connected with the bridge by means of a guide peg 21, on a piston in a hydraulic cylinder 18, which is connected by means of a guide peg 20 with the underside of the frame. The loading bridge 16 is further provided on its inner region with lateral protrusions 17 gripping beneath the arms 10, which limit the descending movement of the outer part of the bridge.

In FIG. 2, 30 and 31 designate the operating device of the hydraulic cylinder 18, by means of which the loading bridge 16 is raised and lowered.

The frame 8 is provided towards the top of the inner side with a horizontal spindle 22, directed towards the front of the loading dock 1, having a roller 23 which runs on the upper side of the rail 7, and also with a bracket 24 which forms the retention for a vertical spindle 25 with a slightly conical roller 26 which runs in the depression of the rail 6, and also finally towards the lower part with a bracket 27 which forms the retention for a vertical spindle 28 with a roller 29 which rests against the rail 4. The carriage can be shifted with the loading bridge 16 laterally along the rails 7, 6 and 4 by means of the rollers 23, 26 and 29.

It is readily apparent that the length of the piston stroke limits the extent of outward movement of the platform with respect to the dock edge.

I claim:

1. A loading bridge for the transport of goods between two surfaces including a loading dock surface and the load surface of a freight vehicle, wherein the loading bridge comprises:
   firstly, a platform having two ends adapted to extend between said two surfaces;
   secondly, means to pivot the platform between a first position in which the two ends respectively rest on the vehicle load surface and an edge portion of the dock loading surface, the dock end always overlapping the dock, and a second position raised therefrom, said pivot means comprising a hydraulic piston and cylinder device pivotally engaging the underside of said platform to effect the raising and lowering thereof, a pair of arms flanking the platform laterally and pivoted at one end to a frame supported on said edge portion of the dock and pins at the other end of said arms engaging the underside of the platform at a first point in front of said piston and cylinder device, and making sliding contact with the platform as the latter is raised and lowered; and thirdly, said platform being provided with pins slidingly engaging the underside of said arms at a second point intermediate the ends thereof so that as the platform is acted upon by said device the platform at the edge portion of the loading surface is raised clear thereof by a pivoting movement of said arms and as the ends of said arms slide along the underside of the platform the end of the platform pivots to a raised position around the ends of said arms.

2. A loading bridge according to claim 1, characterised in that the mounting frame is mounted for horizontal movement movable along the loading dock.

3. A loading bridge according to claim 2, characterised in that said frame consists of an angular chassis, the one approximately vertical part of which, placed before the loading dock, is provided with rollers by means of which the frame is supported and is controlled during its movement by rails on the front of the loading dock, and on the other, approximately horizontal part of which chassis, gripping over the front edge of the dock, there is arranged the mounting.

4. A loading bridge according to claim 3, characterised in that the carriage is provided with one or more rollers mounted on horizontal spindles, which are supported and guided by the upper side of a horizontal inverted channel girder on the front of the loading dock, and with one or more upper rollers mounted on vertical spindles, which rollers are supported and guided by the depression of the channel girder, and also with two or more lower rollers mounted on vertical spindles, which are supported and guided by a flat or angular iron rail on the front of the loading dock.

References Cited

UNITED STATES PATENTS

| 2,592,919 | 4/1952 | Loomis et al. | 14—71 |
| 2,681,698 | 6/1954 | Herman et al. | |
| 2,709,410 | 5/1955 | Fenton | 14—71 XR |
| 2,817,102 | 12/1957 | Harris | 14—71 |
| 3,018,496 | 1/1962 | Hosbein | 14—71 |

JACOB L. NACKENOFF, Primary Examiner